United States Patent
He et al.

(10) Patent No.: US 12,355,660 B2
(45) Date of Patent: Jul. 8, 2025

(54) TRANSIENT LOOP PREVENTION IN ETHERNET VIRTUAL PRIVATE NETWORK EGRESS FAST REROUTE

(71) Applicant: Telefonaktiebolaget LM Ericsson (publ), Stockholm (SE)

(72) Inventors: Jiang He, Beijing (CN); Zhe Zhou, Beijing (CN); Xianmin Li, Beijing (CN); Haifeng Qu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 18/001,233

(22) PCT Filed: Sep. 17, 2020

(86) PCT No.: PCT/IB2020/058644
§ 371 (c)(1),
(2) Date: Dec. 8, 2022

(87) PCT Pub. No.: WO2021/260423
PCT Pub. Date: Dec. 30, 2021

(65) Prior Publication Data
US 2023/0239235 A1 Jul. 27, 2023

(30) Foreign Application Priority Data
Jun. 24, 2020 (WO) ............... PCT/CN2020/098101

(51) Int. Cl.
*H04L 45/28* (2022.01)
*H04L 45/02* (2022.01)
(Continued)

(52) U.S. Cl.
CPC .............. *H04L 45/28* (2013.01); *H04L 45/04* (2013.01); *H04L 45/18* (2013.01); *H04L 45/50* (2013.01); *H04L 12/4641* (2013.01); *H04L 45/22* (2013.01)

(58) Field of Classification Search
CPC ......... H04L 45/28; H04L 45/04; H04L 45/18; H04L 45/50; H04L 12/4641; H04L 45/22; H04L 45/507
See application file for complete search history.

(56) References Cited

U.S. PATENT DOCUMENTS

| 10,356,227 B2 | 7/2019 | Tian et al. |
| 2006/0164975 A1 | 7/2006 | Filsfils et al. |

(Continued)

FOREIGN PATENT DOCUMENTS

| JP | 2018537045 A | 12/2018 |
| WO | 2020052410 A1 | 3/2020 |

OTHER PUBLICATIONS

International Search Report and Written Opinion received for PCT Patent Application No. PCT/CN2020/098101, mailed on Mar. 9, 2021, 15 pages.

(Continued)

*Primary Examiner* — Kibrom T Hailu
(74) *Attorney, Agent, or Firm* — Nicholson, De Vos, Webster & Elliott, LLP; Daniel J. Lee

(57) ABSTRACT

A method by a network device functioning as a provider edge (PE) in an ethernet virtual private network (EVPN) to prevent transient loops between multi-home peer PEs. The method includes advertising a first EVPN label to one or more PEs that are multi-home peer PEs of the PE, advertising a second EVPN label to one or more PEs that are not multi-home peer PEs of the PE, receiving first traffic for a CE that is encapsulated with the first EVPN label as opposed to the second EVPN label, and discarding the first traffic in (Continued)

response to determining that a link between the PE and the CE is not operational and the first traffic for the CE is encapsulated with the first EVPN label.

20 Claims, 8 Drawing Sheets

(51) Int. Cl.
*H04L 45/18* (2022.01)
*H04L 45/50* (2022.01)
*H04L 12/46* (2006.01)
*H04L 45/00* (2022.01)

(56) References Cited

U.S. PATENT DOCUMENTS

2017/0163530 A1* 6/2017 Drake .................. H04L 45/66
2021/0211372 A1* 7/2021 Lin ..................... H04L 45/24

OTHER PUBLICATIONS

International Search Report and Written Opinion received for PCT Patent Application No. PCT/IB2020/058644, mailed on Mar. 9, 2021, 15 pages.
He, et al., "EVPN Egress Fast ReRoute," BESS Working Group, Internet Draft, draft-jiang-bess-evpn-egress-frr-00, Jun. 29, 2020, 8 pages.
Sajassi, et al., "A Network Virtualization Overlay Solution Using Ethernet VPN (EVPN)," IETF RFC 8365, Mar. 2018, 33 pages.
Sajassi, et al., "BGP MPLS-Based Ethernet VPN," IETF RFC 7432, Feb. 2015, 56 pages.
Sajassi, et al., "IGMP and MLD Proxy for EVPN," BESS WorkGroup, Internet Draft, draft-ietf-bess-evpn-igmp-mld-proxy-05, Apr. 28, 2020, 38 pages.
Sajassi, et al., "IGMP and MLD Proxy for EVPN," BESS Working Group, Internet Draft, draft-ietf-bess-evpn-igmp-mld-proxy-04, Sep. 30, 2019, 37 pages.

* cited by examiner

Ethernet segment
import route target
extended community
field format 410 

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type=0x06     | Sub-Type=0x02 |          ES-Import             |
+-+-+-+-+-+-+-+-+-+-+-+-+-+-+-+-+-+-+-+-+-+-+-+-+-+-+-+-+-+-+-+-+
|                        ES-Import Cont'd                        |
+-+-+-+-+-+-+-+-+-+-+-+-+-+-+-+-+-+-+-+-+-+-+-+-+-+-+-+-+-+-+-+-+
```

Figure 4A

EVI-RT extended
community field
format 420 

```
                     1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type=0x06     | Sub-Type=n    |      RT associated with EVI    |
+-+-+-+-+-+-+-+-+-+-+-+-+-+-+-+-+-+-+-+-+-+-+-+-+-+-+-+-+-+-+-+-+
|                  RT associated with the EVI (cont.)            |
+-+-+-+-+-+-+-+-+-+-+-+-+-+-+-+-+-+-+-+-+-+-+-+-+-+-+-+-+-+-+-+-+
```

Figure 4B

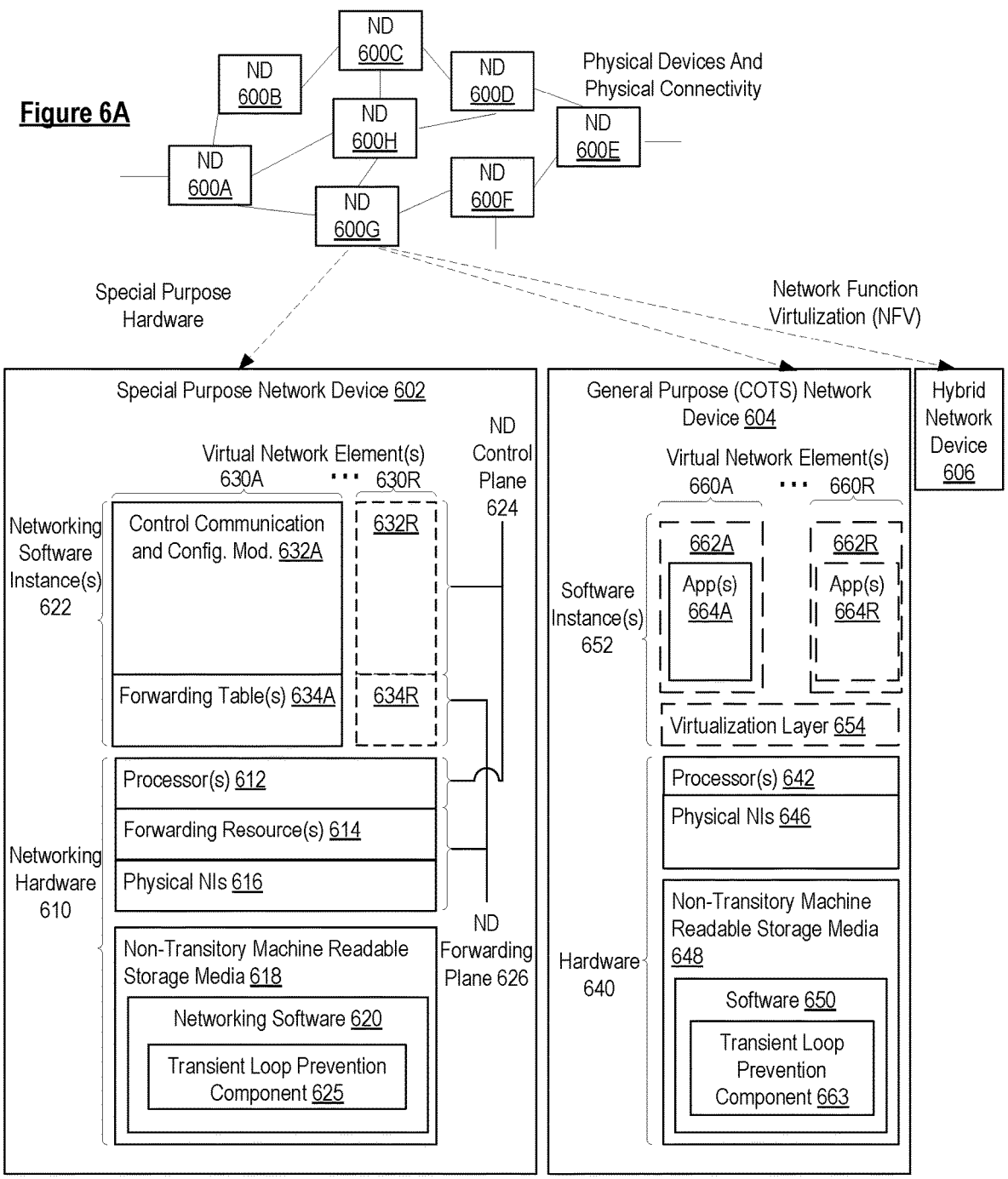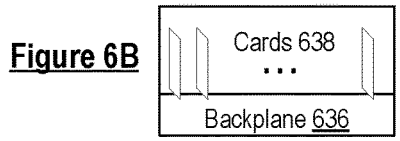

TRANSIENT LOOP PREVENTION IN ETHERNET VIRTUAL PRIVATE NETWORK EGRESS FAST REROUTE

CROSS-REFERENCE TO RELATED APPLICATIONS

This application is a national stage of International Application No. PCT/IB2020/058644, filed Sep. 17, 2020, which claims the benefit of International Application No. PCT/CN2020/098101, filed Jun. 24, 2020, which are hereby incorporated by reference.

TECHNICAL FIELD

Embodiments relate to the field of computer networks, and more specifically to preventing transient loops between multi-home peer provider edges in an ethernet virtual private network.

BACKGROUND

Ethernet virtual private network (EVPN) is a technology for carrying layer 2 ethernet traffic as a virtual private network using wide area network protocols. EVPN technologies include ethernet over multi-protocol label switching (MPLS) and ethernet over virtual extensible local area network (VXLAN).

An EVPN instance may include customer edges (CEs) that are connected to provider edges (PEs) that form the edge of a network infrastructure. PEs may be connected to other PEs over a multiprotocol label switching (MPLS) infrastructure, which provides the benefits of MPLS technology, such as fast reroute and resiliency. Alternatively, PEs may be connected to other PEs over an IP infrastructure, in which case generic routing encapsulation (GRE) tunneling or other internet protocol (IP) tunneling can be used between the PEs. A CE may be a host, a router, or a switch. The PEs provide virtual layer 2 bridged connectivity between the CEs. A network may include multiple EVPN instances.

In EVPN, media access control (MAC) learning between PEs occurs in the control plane as opposed to the data plane. Control plane learning offers greater control over the MAC learning process such as restricting who learns what, and the ability to apply policies. Multi-protocol border gateway protocol (MP-BGP) is commonly used as the control plane protocol in EVPN for advertising MAC reachability information. For example, PEs may advertise the MAC addresses learned from the CEs that are connected to them, along with an EVPN label (e.g., a MPLS label), to other PEs in the control plane using MP-BGP.

EVPN multi-homing allows a CE to be connected to more than one PE. EVPN multi-homing may provide load balancing, link/node redundancy, and fast convergence. Multi-homing may operate in single-active mode or all-active mode. In single-active mode only a single PE among a group of PEs attached to the particular ethernet segment is allowed to forward traffic to and from that ethernet segment. In all-active mode all of the PEs attached to the particular ethernet segment are allowed to forward traffic to and from that ethernet segment. Upon detecting a link failure, a PE withdraws the corresponding set of ethernet auto-discovery (A-D) per ethernet segment (ES) routes, which triggers other PEs to switchover to sending traffic towards a multi-home peer of the PE. However, failure propagation and switchover may take a relatively long time, especially in highly scaled environments.

The switchover performance can be improved by using a local protection mechanism such as egress fast reroute (eFRR). With eFRR, if a PE receives traffic for a CE but detects that the link between the PE and the CE is not operational, the PE may forward the traffic to a multi-home peer PE (e.g., another PE that provides connectivity to the CE). The PE may accomplish this by encapsulating the traffic for the CE with the EVPN label advertised by the multi-home peer PE and forwarding the encapsulated traffic to the multi-home peer PE. However, if the link between the multi-home peer PE and the CE is also not operational (e.g., due to failure at the CE itself) then the multi-home peer PE will forward the traffic back to the PE (as part of eFRR being performed at the multi-home peer PE). The PE and the multi-home peer PE will continue forwarding traffic to each other in this manner until an ethernet A-D per ES route withdrawal is received by one of the PE, thereby creating a transient loop. The transient loop can sometimes last on the order of seconds, which results in unnecessary bandwidth consumption in EVPN.

SUMMARY

A method by a network device functioning as a provider edge (PE) in an ethernet virtual private network (EVPN) to prevent transient loops between multi-home peer PEs. The method includes advertising a first EVPN label to one or more PEs that are multi-home peer PEs of the PE, where PEs are multi-home peer PEs with respect to each other if they provide connectivity to the same customer edge (CE) in the same EVPN instance, advertising a second EVPN label to one or more PEs that are not multi-home peer PEs of the PE, receiving first traffic for a CE that is encapsulated with the first EVPN label as opposed to the second EVPN label, and discarding the first traffic in response to determining that a link between the PE and the CE is not operational and the first traffic for the CE is encapsulated with the first EVPN label. The method may further include receiving second traffic for the CE that is encapsulated with the second EVPN label as opposed to the first EVPN label and forwarding the second traffic to a multi-home peer PE of the PE in response to determining that the link between the PE and the CE is not operational and the second traffic for the CE is encapsulated with the second EVPN label.

A non-transitory machine-readable storage medium that provides instructions that, if executed by a processor of a network device functioning as a provider edge (PE) in an ethernet virtual private network (EVPN), will cause the network device to perform operations for preventing transient loops between multi-home peer PEs. The operations include advertising a first EVPN label to one or more PEs that are multi-home peer PEs of the PE, where PEs are multi-home peer PEs with respect to each other if they provide connectivity to the same customer edge (CE) in the same EVPN instance, advertising a second EVPN label to one or more PEs that are not multi-home peer PEs of the PE, receiving first traffic for a CE that is encapsulated with the first EVPN label as opposed to the second EVPN label, and discarding the first traffic in response to determining that a link between the PE and the CE is not operational and the first traffic for the CE is encapsulated with the first EVPN label. The operations may further include receiving second traffic for the CE that is encapsulated with the second EVPN label as opposed to the first EVPN label and forwarding the second traffic to a multi-home peer PE of the PE in response to determining that the link between the PE and the CE is not operational and the second traffic for the CE is encapsulated with the second EVPN label.

A network device to function as a provider edge (PE) in an ethernet virtual private network (EVPN) to prevent transient loops between multi-home peer PEs. The network device includes a set of one or more processors and a non-transitory machine-readable storage medium that provides instructions that, if executed by the set of one or more processors, will cause the network device to advertise a first EVPN label to one or more PEs that are multi-home peer PEs of the PE, wherein PEs are multi-home peer PEs with respect to each other if they provide connectivity to the same customer edge (CE) in the same EVPN instance, advertise a second EVPN label to one or more PEs that are not multi-home peer PEs of the PE, receive first traffic for a CE that is encapsulated with the first EVPN label as opposed to the second EVPN label, and discard the first traffic in response to determining that a link between the PE and the CE is not operational and the first traffic for the CE is encapsulated with the first EVPN label. The non-transitory machine-readable storage medium may provide further instructions that, if executed by the set of one or more processors, will cause the network device to receive second traffic for the CE that is encapsulated with the second EVPN label as opposed to the first EVPN label and forward the second traffic to a multi-home peer PE of the PE in response to determining that the link between the PE and the CE is not operational and the second traffic for the CE is encapsulated with the second EVPN label.

BRIEF DESCRIPTION OF THE DRAWINGS

The invention may best be understood by referring to the following description and accompanying drawings that are used to illustrate embodiments of the invention. In the drawings:

FIG. 4A is a diagram illustrating an ethernet segment import route target extended community field format, according to some embodiments.

FIG. 4B is a diagram illustrating an EVI-RT (sometimes referred to as "ethernet virtual private network instance route target") extended community field format, according to some embodiments.

FIG. 6A illustrates connectivity between network devices (NDs) within an exemplary network, as well as three exemplary implementations of the NDs, according to some embodiments.

FIG. 6B illustrates an exemplary way to implement a special-purpose network device according to some embodiments.

DETAILED DESCRIPTION

Figure 1:
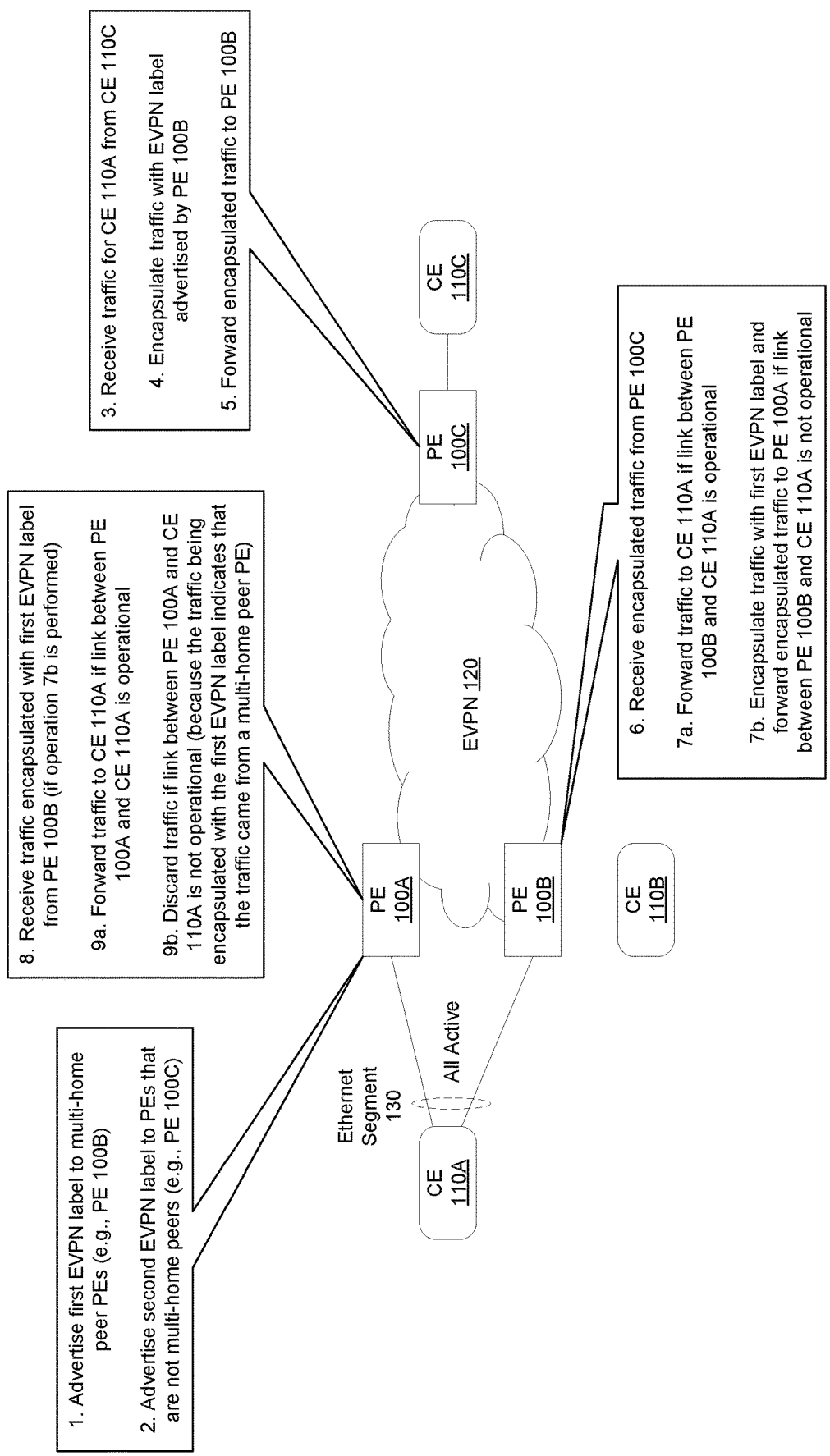
FIG. 1 is a block diagram illustrating operations in an ethernet virtual private network (EVPN) system and operations therein, according to some embodiments.

The following description describes methods and apparatus for preventing transient loops between multi-home peer provider edges (PEs) in an ethernet virtual private network (EVPN). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, with egress fast reroute (eFRR), if a provider edge (PE) receives traffic for a customer edge (CE) but detects that a link between the PE and the CE is not operational, the PE may forward the traffic to a multi-home peer PE (e.g., another PE that is provides connectivity to the CE). The PE may accomplish this by encapsulating the traffic for the CE with the EVPN label advertised by the multi-home peer PE and forwarding the encapsulated traffic to the multi-home peer PE. However, if the link between the multi-home peer PE and the CE is also not operational (e.g., due to failure at the CE itself) then the multi-home peer PE will forward the traffic back to the PE (as part eFRR being performed at the multi-home peer PE). The PE and the multi-home peer PE will continue forwarding traffic to each other in this manner until an ethernet A-D per ES route withdrawal is received by one of the PE, thereby creating a transient loop. The transient loop can sometimes last on the order of seconds, which results in unnecessary bandwidth consumption in EVPN.

Embodiments disclosed herein provide a mechanism for preventing transient loops between multi-home peer PEs. According to some embodiments, a PE in an EVPN advertises a first EVPN label to one or more PEs that are multi-home peer PEs of the PE and advertises a second EVPN label to one or more PEs that are not multi-home peer PEs of the PE. If the PE receives traffic for a CE, the PE may determine whether the link between the PE and the CE is operational. If the link between the PE and CE is operational, then the PE may forward the traffic to the CE. However, if the link between the PE and the CE is not operational, then the PE may determine how to handle the traffic based on whether the traffic is encapsulated with the first EVNP label or the second EVPN label. If the traffic is encapsulated with the first EVPN label, then this indicates that the traffic came from a multi-home peer PE, and thus the PE discards the traffic without forwarding the traffic to a multi-home peer PE to avoid causing a transient loop. However, if the traffic is encapsulated with the second EVPN label, then this indicates that the traffic did not come from a multi-home peer PE, and thus the PE may forward the traffic to a multi-home peer PE to provide local protection. Embodiments disclosed herein may thus prevent transient loops between multi-home peer PEs, and as a result avoid/reduce unnecessary bandwidth consumption in EVPN caused by transient loops. Embodiments are further described herein below with reference to the accompanying drawings.

FIG. 1 is a block diagram illustrating an EVPN system and operations therein for preventing transient loops between multi-home peer PEs, according to some embodiments. As shown in the diagram, the EVPN system includes an EVPN 120 that includes PE 100A, PE 100B, and PE 100C. The EVPN 120 may be implemented using, for example, a multiprotocol label switching (MPLS) infrastructure. However, it should be understood that the EVPN 120 may be implemented using other types of network virtualization overlay (NVO) infrastructures such as a virtual extensible local area network (VXLAN) infrastructure, a network virtualization using generic routing encapsulation (NVGRE) infrastructure, or a generic network virtualization encapsulation (GENEVE) infrastructure. CE 110A is multi-homed to PE 100A and PE 100B. EVPN multi-homing may provide load balancing, link/node redundancy, and fast convergence. The links connecting CE 110A to PE 100A and PE 100B may collectively form an ethernet segment 130. The ethernet segment 130 may be uniquely identified using an ethernet segment identifier (ESI). In this example, PE 100A and PE 100B are multi-home peer PEs with respect to each other. As used herein, PEs are multi-home peer PEs with respect to each other if they provide connectivity to the same CE (e.g., via an ethernet segment) in the same EVPN instance. In this example, the ethernet segment 130 operates in all-active mode (as opposed to single-active mode). In all-active mode all of the PEs 100 attached to the particular ethernet segment are allowed to forward traffic to and from that ethernet segment. Also, in this example, CE 110B is single-homed to PE 100B and CE 110C is single-homed to PE 100C. Each of the PEs 100 and the CEs 110 may be implemented using one or more network devices. A CE 110 may be, for example, a host, a router, or a switch. While the diagram shows the EVPN system as having a particular arrangement, it should be understood that the EVPN system may have a different arrangement than shown in the diagram (e.g., the EVPN system may include additional PEs 100, additional CEs 110, and/or other network components).

As will be further described herein, one or more PEs 100 in the EVPN system may implement a mechanism to prevent transient between multi-home peer PEs (which may generally be referred to herein as a transient loop prevention mechanism). In one embodiment, a PE (e.g., PE 100A) may implement the transient loop prevention mechanism based on advertising a first EVPN label to one or more PEs that are multi-home peer PEs of the PE (e.g., PE 100B) and advertising a second EVPN label (that is different from the first EVPN label) to one or more PEs that are not multi-home peer PEs of the PE (e.g., PE 100C). In an embodiment where the EVPN 120 is implemented using an MPLS infrastructure, the first EVPN label and the second EVPN label may be MPLS labels. In an embodiment where the EVPN 120 is implemented using a VxLAN/NVGRE/GENEVE infrastructure, the first EVPN label and the second EVPN label may be VxLAN network identifiers (VNIs).

In one embodiment, the PE advertises the first EVPN label using a border gateway protocol (BGP) advertisement message (e.g., by sending a BGP advertisement message to multi-home peer PEs of the PE). The BGP advertisement message may indicate the first EVPN label and a route associated with the first EVPN label, which may be, for example, an ethernet auto-discovery route per EVPN instance or a media access control/internet protocol (MAC/IP) advertisement route. It should be noted that in EVPN virtual private wire service (VPWS) only the ethernet auto-discovery route per EVPN instance may be used (since the MAC/IP advertisement route is not used in EVPN VPWS).

The BGP advertisement message may also indicate a group identifier associated with the route associated with the first EVPN label and an EVPN instance associated with the route associated with the first EVPN label, where the combination of the group identifier and the EVPN instance uniquely identifies a multi-home peer group (i.e., a group of PEs that are multi-home peer PEs with respect to each other) that the advertising PE is a member of. In one embodiment, only the PEs that are members of the multi-home peer group identified by combination of the group identifier and the EVPN instance may store/import the advertised label/route. Thus, indicating the group identifier and EVPN instance in the BGP advertisement message may ensure that the first EVPN label and the associated route is only stored/imported by multi-home peer PEs of the advertising PE (and not stored/imported by PEs that are not multi-home peer PEs of the advertising PE). The group identifier may be an identifier that uniquely identifies a multi-home peer group in a given EVPN instance. PEs that are members of the group may have been preconfigured with the group identifier or otherwise have knowledge of the group identifier. In one embodiment, the group identifier is generated based on an ethernet segment identifier. The group identifier by itself may not be sufficient to uniquely identify a multi-home peer group if there are multiple EVPN instances because it may be possible for the same group identifier to be used across different EVPN instances, and thus a combination of group identifier and EVPN instance may be used to uniquely identify a multi-home peer group. In one embodiment, the group identifier associated with the route associated with the first EVPN label is indicated using an ethernet segment import route target extended community field included in the BGP advertisement message and the EVPN instance associated with the route associated with the first EVPN label is indicated using an EVI-RT extended community field included in the BGP advertisement message to ensure that the first EVPN label is only stored/imported by PEs that are multi-home peer PEs of the advertising PE. An example of an ethernet segment import route target extended community field format and an EVI-RT extended community field format is shown in FIGS. 4A and 4B, respectively.

In one embodiment, the BGP advertisement message indicates a preference level associated with the route associated with the first EVPN label that is higher than a preference level associated with the route associated with the second EVPN label. This may be particularly relevant when both the first EVPN label and the second EVPN label are advertised to multi-home peer PEs of the advertising PE (e.g., this may be the case when labels/routes are broadcasted (e.g., using a BGP route reflector) instead of being sent point-to-point). In this case, the multi-home peer PEs that receive the advertisements will give preference to the first EVPN label over the second EVPN label. In one embodiment, the preference level associated with the route is indicated using a local preference field (e.g., LOCAL_PREF field) included in the BGP advertisement message.

If the advertising PE subsequently receives traffic for a connected CE (a CE connected to the PE via an ethernet segment) from another PE in the EVPN 120, the PE may determine whether the link between itself and the connected CE is operational. The PE may determine whether the link is operational using any suitable link failure detection mechanism. If the PE determines that the link is operational, then the PE may forward the traffic to the connected CE (e.g., via an ethernet segment), and traffic delivery is complete. However, if the link between the PE and the connected CE is not operational (e.g., this could be due to a failure of the CE and/or the PE or a failure of the link itself), then the PE may determine how to handle the traffic based on whether the traffic is encapsulated with the first EVPN label or the second EVPN label. If the traffic is encapsulated with the second EVPN label, then this indicates that the traffic did not come from a multi-home peer PE, and thus the PE may forward the traffic to a multi-home peer PE to provide local protection. However, if the traffic is encapsulated with the first EVPN label, then this indicates that the traffic came from a multi-home peer PE, and thus the PE discards the traffic without forwarding the traffic to the CE and without forwarding the traffic to a multi-home peer PE (as would be done with conventional EFRR) to avoid causing a transient loop.

Example operations performed in the EVPN system are now described with reference to FIG. 1 to further illustrate the transient loop prevention mechanism. The operations shown in FIG. 1 illustrate a scenario where CE 110C sends traffic to CE 110A and PE 100C decides to forward the traffic for CE 110A to PE 100B. In this example, PE 100A implements the transient loop prevention mechanism, while the other PEs (e.g., PE 100B and PE 100C) may or may not implement the transient loop prevention mechanism.

Referring to FIG. 1, at operation '1', PE 100A advertises a first EVPN label to its multi-home peer PEs (e.g., PE 100B). At operation '2', PE 100A advertises a second EVPN label to PEs that are not multi-home peer PEs (e.g., PE 100C). PE 100A may advertise the first EVPN label to its multi-home peer PEs using a BGP advertisement message that indicates the first EVPN label, the route associated with the first EVPN label (which may be an ethernet auto-discovery route per EVPN instance or a MAC/IP advertisement route), a group identifier (which may be generated based on an ESI of the ethernet segment 130), and an EVPN instance, where the combination of the group identifier and the EVPN instance uniquely identifies the group of PEs that are multi-home peer PEs of PE 100A.

At operation '3', PE 100C receives traffic for CE 110A (which is connected to PE 100A and PE 100B via the ethernet segment 130) from CE 110C. Since CE 110A is multi-homed to PE 100A and PE 100B (and the ethernet segment 130 operates in all-active mode), it can be reached via either PE 100A or PE 100B (and the decision of which PE to forward traffic to is a local decision at PE 100C). In this example, PE 100C decides to forward the traffic to PE 100B. Thus, at operation '4', PE 100C encapsulates the traffic with the EVPN label previously advertised by PE 100B and at operation '5', forwards the traffic to PE 100B.

At operation '6', PE 100B receives the encapsulated traffic from PE 100C. Upon receiving the encapsulated traffic, PE 100B determines whether the link between itself and CE 110A is operational. If PE 100B determines that the link is operational, then it performs operation '7a', where it forwards the traffic to CE 110A, and traffic delivery is complete. However, if PE 100B determines that the link is not operational, then it performs operation '7b', where it encapsulates the traffic with the first EVPN label (previously advertised by PE 100A at operation '1') and forwards the traffic to PE 100A to provide local protection.

Assuming PE 100B performs operation '7b', at operation '8', PE 100A receives the traffic encapsulated with the first EVPN label from PE 100B. Upon receiving the traffic encapsulated with the first EVPN label, PE 100A determines whether the link between itself and CE 110A is operational. If PE 100A determines that the link is operational, then it performs operation '9a', where it forwards the traffic to CE 110A, and traffic delivery is complete. However, if PE 100A determines that the link is not operational, then it performs operation '9b', where it discards the traffic (without forwarding the traffic to CE 110A and without forwarding the traffic to PE 100B) because the traffic being encapsulated with the first EVPN label indicates that the traffic came from a multi-home peer PE. This prevents a transient loop between PE 100A and PE 100B.

Figure 2:
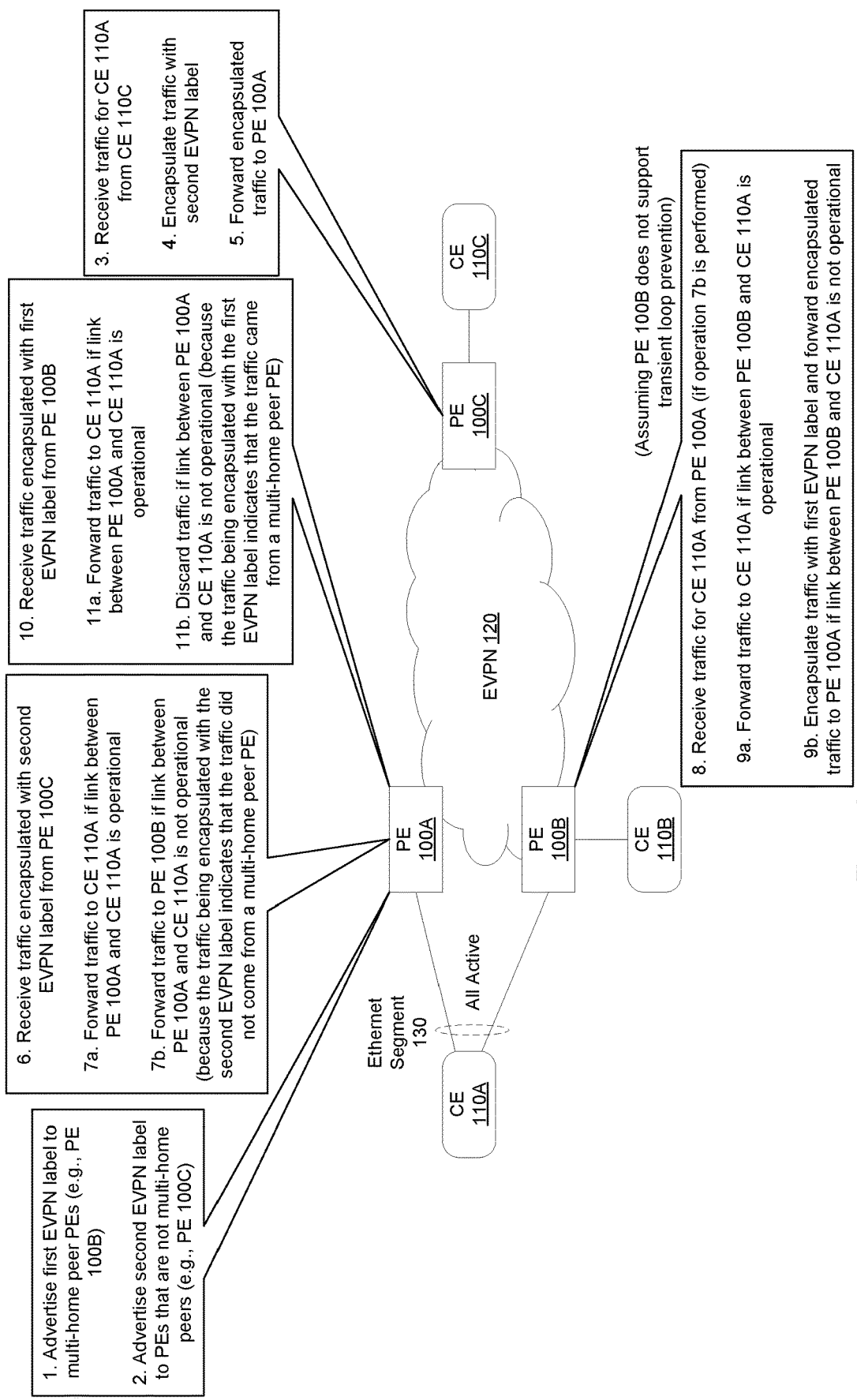
FIG. 2 is a block diagram illustrating operations in the EVPN system for another scenario, according to some embodiments.

FIG. 2 is a block diagram illustrating operations in the EVPN system for another scenario, according to some embodiments. The operations shown in FIG. 2 illustrate a scenario similar to the scenario illustrated in FIG. 1 except that PE 100C decides to forward traffic for CE 110A to PE 100A (instead of PE 100B as illustrated in FIG. 1). In this example, PE 100A implements the transient loop prevention mechanism, while PE 100B does not implement the transient loop prevention mechanism (e.g., it implements conventional eFRR). PE 100C may or may not implement the transient loop prevention mechanism. At operation '1', PE 100A advertises a first EVPN label to multi-home peer PEs (e.g., PE 100B). At operation '2', PE 100A advertises a second EVPN label to PEs that are not multi-home peer PEs (e.g., PE 100C). PE 100A may advertise the first EVPN label to multi-home peer PEs using a BGP advertisement message, as described above.

At operation '3', PE 100C receives traffic for CE 110A (which is connected to PE 100A and PE 100B via the ethernet segment 130). Since CE 110A is multi-homed to PE 100A and PE 100B (and the ethernet segment 130 operates in all-active mode), it can be reached via either PE 100A or PE 100B (and the decision of which PE to forward traffic to is a local decision at PE 100C). In this example, PE 100C decides to forward the traffic to PE 100A. Thus, at operation '4', PE 100C encapsulates the traffic with the second EVPN label (previously advertised by PE 100B at operation '2') and at operation '5', forwards the traffic encapsulated with the second EVPN label to PE 100A.

At operation '6', PE 100A receives the traffic encapsulated with the second EVPN label from PE 100C. Upon receiving the encapsulated traffic, PE 100A determines whether the link between itself and CE 110A is operational. If PE 100A determines that the link is operational, then it performs operation '7a', where it forwards the traffic to CE 110A, and traffic delivery is complete. However, if PE 100A determines that the link is not operational, then it performs operation '7b', where it forwards the traffic to PE 100B for local protection because the traffic being encapsulated with the second EVPN label indicates that the traffic did not come from a multi-home peer PE.

Assuming PE 100A performs operation '7b', at operation '8', PE 100B receives the traffic from PE 100A. Upon receiving the traffic, PE 100B determines whether the link between itself and CE 110A is operational. If PE 100B determines that the link is operational, then it performs operation '9a', where it forwards the traffic to CE 110A, and traffic delivery is complete. However, if PE 100B determines that the link is not operational, then it performs operation '9b', where it encapsulates the traffic with the first EVPN label (previously advertised by PE 100A at operation '1') and forwards the traffic to PE 100A to provide local protection.

Assuming PE 100B performs operation '9b', at operation '10', PE 100A receives the traffic encapsulated with the first EVPN label from PE 100B. Upon receiving the traffic encapsulated with the first EVPN label, PE 100A determines whether the link between itself and CE 110A is operational. If PE 100A determines that the link is operational, then it performs operation '11a', where it forwards the traffic to CE 110A, and traffic delivery is complete. However, if PE 100A determines that the link is not operational, then it performs operation where it discards the traffic (without forwarding the traffic to CE 110A and without forwarding the traffic to PE 100B) because the traffic being encapsulated with the first EVPN label indicates that the traffic came from a multi-home peer PE. This prevents a transient loop between PE 100A and PE 100B.

As mentioned above, in this example, PE 100B does not implement a transient loop prevention mechanism. However, if PE 100B did implement a transient loop prevention mechanism then it may have discarded the traffic received from PE 100A (e.g., traffic received at operation '8') if the link between itself and CE 110A was not operational to prevent a transient loop.

Figure 3:
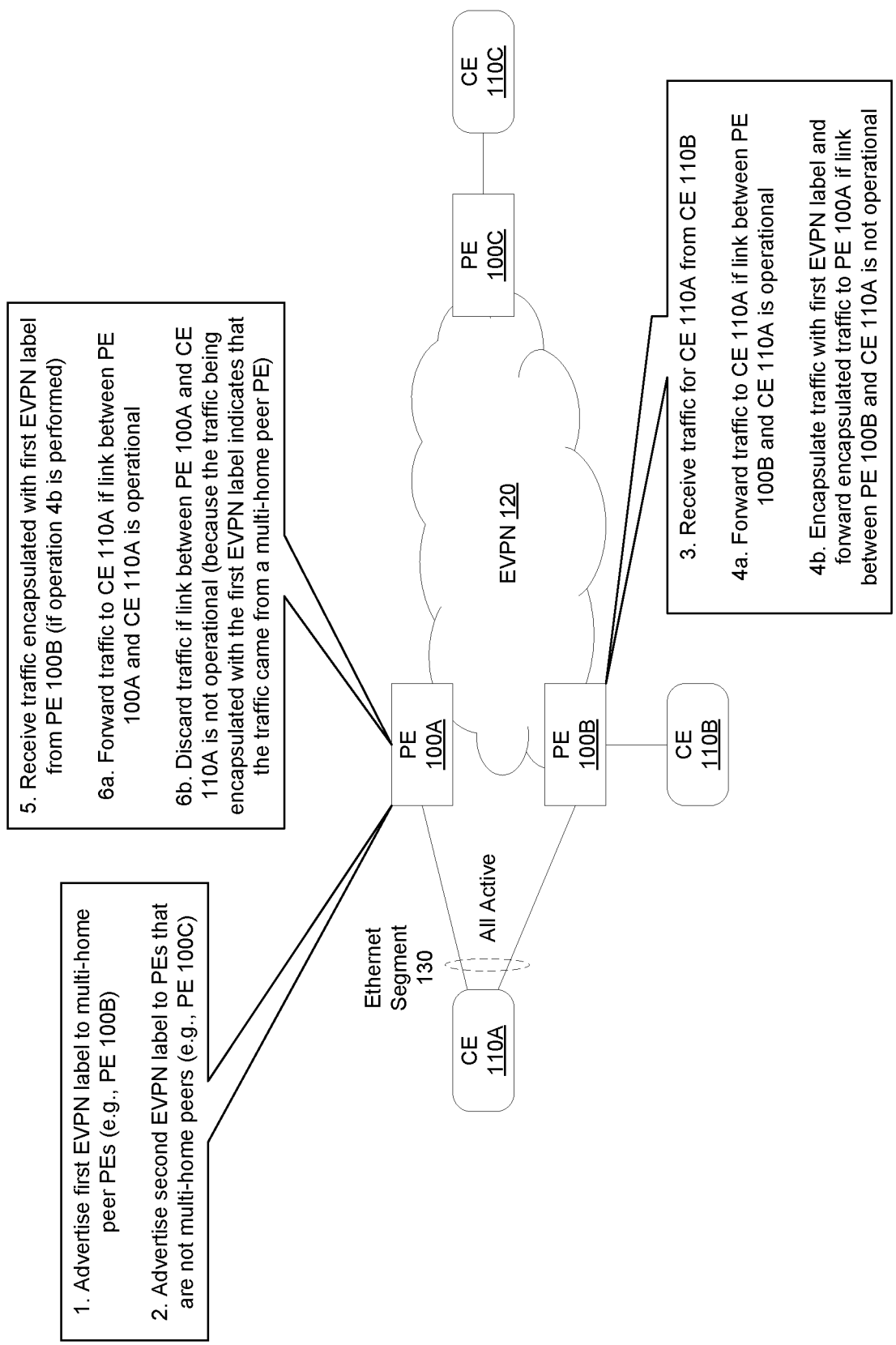
FIG. 3 is a block diagram illustrating operations in the EVPN system for yet another scenario, according to some embodiments.

FIG. 3 is a block diagram illustrating operations in the EVPN system for yet another scenario, according to some embodiments. The operations shown in FIG. 3 illustrate a scenario where CE 110B sends traffic to CE 110A. In this example, PE 100A implements the transient loop prevention mechanism, while the other PEs (e.g., PE 100B and PE 100C) may or may not implement the transient loop prevention mechanism. At operation '1', PE 100A advertises a first EVPN label to multi-home peer PEs (e.g., PE 100B). At operation '2', PE 100A advertises a second EVPN label to PEs that are not multi-home peer PEs (e.g., PE 100C). PE 100A may advertise the first EVPN label to multi-home peer PEs using a BGP advertisement message, as described above.

At operation '3', PE 100B receives traffic for CE 110A from CE 110B. Upon receiving the traffic, PE 100B determines whether the link between itself and CE 110A is operational. If PE 100B determines that the link is operational, then it performs operation '4*a*', where it forwards the traffic to CE 110A, and traffic delivery is complete. However, if PE 100B determines that the link is not operational, then it performs operation '4*b*', where it encapsulates the traffic with the first EVPN label (previously advertised by PE 100A at operation '1') and forwards the traffic to PE 100A to provide local protection.

Assuming PE 100B performs operation '4*b*', at operation '5', PE 100A receives the traffic encapsulated with the first EVPN label from PE 100B. Upon receiving the traffic encapsulated with the first EVPN label, PE 100A determines whether the link between itself and CE 110A is operational. If PE 100A determines that the link is operational, then it performs operation '6*a*', where it forwards the traffic to CE 110A, and traffic delivery is complete. However, if PE 100A determines that the link is not operational, then it performs operation '6*b*', where it discards the traffic (without forwarding the traffic to CE 110A and without forwarding the traffic to PE 100B) because the traffic being encapsulated with the first EVPN label indicates that the traffic came from a multi-home peer PE. This prevents a transient loop between PE 100A and PE 100B.

A benefit of the transient loop prevention mechanism described herein is that it is a local protection mechanism (and thus does not require propagating network reachability information throughout the network for traffic to be properly forwarded), and thus provides fast reroute (e.g., it has been found that reroute in ~50 milliseconds is possible). Another benefit of the transient loop prevention mechanism is that it can be deployed incrementally. As can be seen from the examples provided above, it is not required that all PEs support the transient loop prevention mechanism for traffic to be properly forwarded to CEs. Traffic can be properly forwarded to CEs even if only some of the PEs in the EVPN system implement the transient loop prevention mechanism. As such, the transient loop prevention mechanism can be deployed incrementally across the PEs in the EVPN system over time. Yet another advantage of the transient loop prevention mechanism is that it can work together with conventional EVPN convergence solutions. That is, the transient loop prevention mechanism can be used to temporarily reroute traffic while the conventional EVPN convergence solution propagates network reachability information to the PEs in the EVPN system. Traffic can be forwarded using the updated network reachability information once convergence occurs.

FIG. 4A is a diagram illustrating an ethernet segment import route target extended community field format, according to some embodiments. As shown in the diagram, the ethernet segment import route target extended community field format 410 may include a type subfield indicating a value of 0x06, a sub-type subfield indicating a value of 0x02, and an ethernet segment import (ES-import) subfield. The ethernet segment import route target extended community is defined in Internet Engineering Task Force (IETF) Request for Comment 7432 (RFC 7432). As mentioned above, the ethernet segment import route target extended community field may be used to indicate the group identifier associated with a route (that together with the EVPN instance uniquely identifies a multi-home peer group that the route is intended for). For example, the group identifier may be indicated in the ES-import subfield.

FIG. 4B is a diagram illustrating an EVI-RT extended community field format, according to some embodiments. As shown in the diagram, the EVI-RT extended community field format 420 may include a type subfield indicating a value of 0x06, a sub-type subfield, and a route type (RT) associated with the EVPN instance (EVI) subfield. The ethernet segment import route target extended community is defined in IETF draft-ietf-bess-evpn-igmp-mld-proxy. As mentioned above, the EVI-RT extended community field may be used to indicate the EVPN instance associated with a route (that together with the group identifier uniquely identifies a multi-home peer group that the route is intended for). For example, the EVPN instance may be indicated in the RT associated with the EVI subfield.

In one embodiment, when advertising an EVPN label/route (e.g., ethernet auto-discovery route per EVI or MAC/IP advertisement route), a PE must include exactly one ethernet segment import route target extended community and exactly one EVI-RT extended community.

Figure 5:
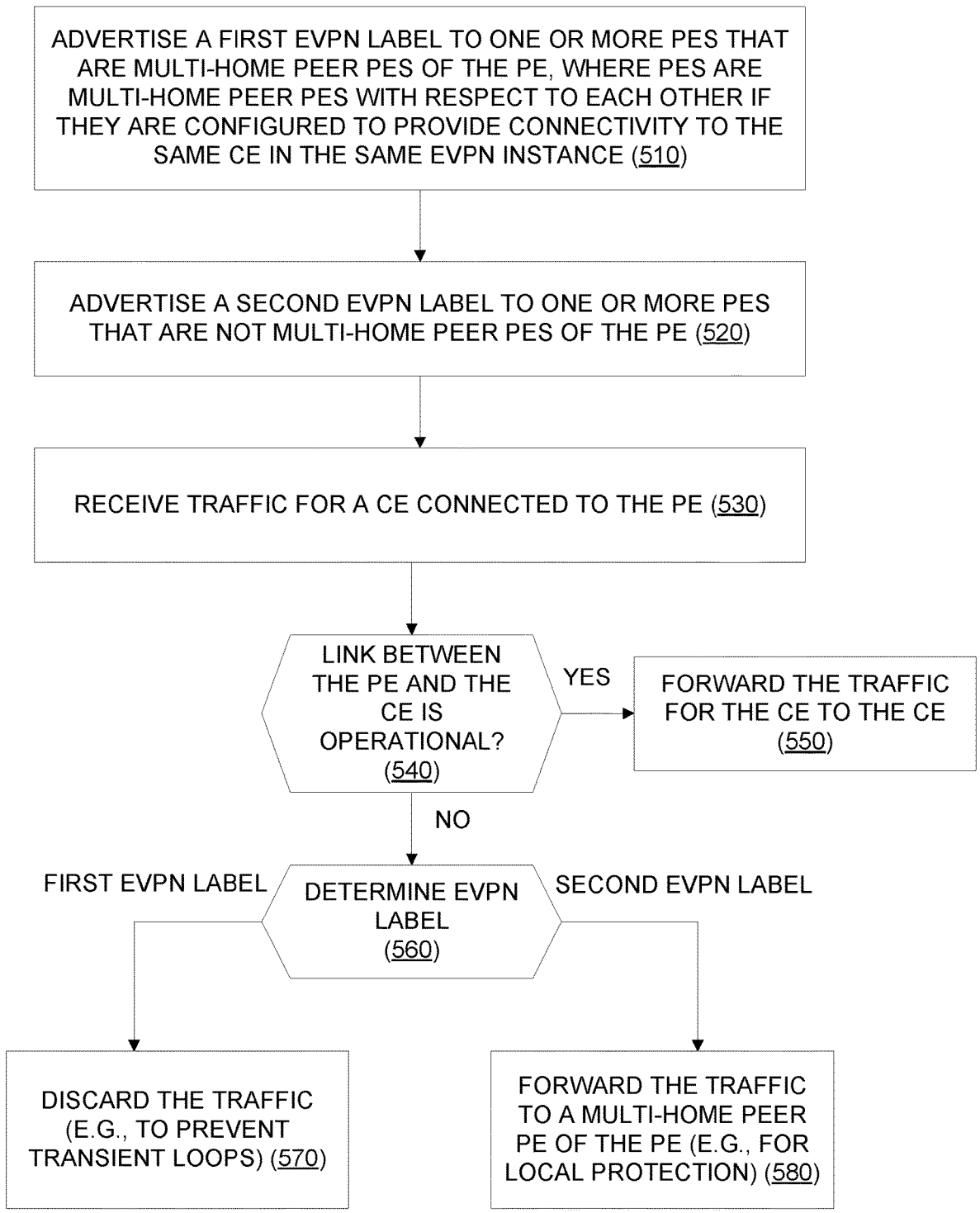
FIG. 5 is a flow diagram of a process for preventing transient loops between multi-home peer PEs, according to some embodiments.

FIG. 5 is a flow diagram of a process for preventing transient loops between multi-home peer PEs, according to some embodiments. In one embodiment, the process is implemented by a network device functioning as a PE in an EVPN. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

At block 510, the PE advertises a first EVPN label to one or more PEs that are multi-home peer PEs of the PE, where PEs are multi-home peer PEs with respect to each other if they provide connectivity to the same CE in the same EVPN instance. In one embodiment, the first EVPN label is advertised using a BGP advertisement message. In one embodiment, the BGP advertisement message indicates a route associated with the first EVPN label, wherein the route is an ethernet auto-discovery route per EVPN instance route or a MAC/IP advertisement route. In one embodiment, the BGP advertisement message indicates a group identifier associated with the route and an EVPN instance associated with the route, wherein the group identifier associated with the route is indicated using an ethernet segment import route target extended community field included in the BGP advertisement message and the EVPN instance associated with the route is indicated using an EVI-RT extended community field included in the BGP advertisement message. In one embodiment, the BGP advertisement message indicates a preference level associated with the route, where the preference level associated with the route is indicated using a local preference field included in the BGP advertisement message, where when both the first EVPN label and the second EVPN label are advertised to multi-home peer PEs of the PE the preference level associated with the route associated with the first EVPN label is higher than a preference level associated with a route associated with the second EVPN label. In one embodiment, the first EVPN label is an MPLS label. In another embodiment, the first EVPN label is a VNI.

At block 520, the PE advertises a second EVPN label (that is different from the first EVPN label) to one or more PEs that are not multi-home peer PEs of the PE.

At block 530, the PE receives traffic for a CE connected to the PE.

At decision block 540, the PE determines whether the link between the PE and the CE is operational. If the PE determines that the link is operational, then at block 550, the PE forwards the traffic for the CE to the CE (regardless of whether the traffic is encapsulated with the first EVPN label or the second EVPN label). However, if the PE determines that the link is not operational, then at decision block 560, the PE determines the EVPN label (the EVPN label that encapsulates the traffic). In one embodiment, the link to the CE is not operational due to a failure of the CE or the PE (or the failure of the link itself). If the EVPN label is the first EVPN label, then at block 570, the PE discards the traffic (e.g., to prevent transient loops). However, if the EVPN label is the second EVPN label, then at block 580, the PE forwards the traffic to a multi-home peer PE of the PE (e.g., for local protection).

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

In one embodiment software 620 includes code such as transient loop prevention component 625, which when executed by networking hardware 610, causes the special-purpose network device 602 to perform operations of one or more embodiments of the present invention as part of networking software instances 622 (e.g., to prevent transient loops between multi-home peer PEs).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

In one embodiment, software 650 includes code such as transient loop prevention component 663, which when executed by processor(s) 642, causes the general purpose network device 604 to perform operations of one or more embodiments of the present invention as part of software instances 662A-R (e.g., to prevent transient loops between multi-home peer PEs).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
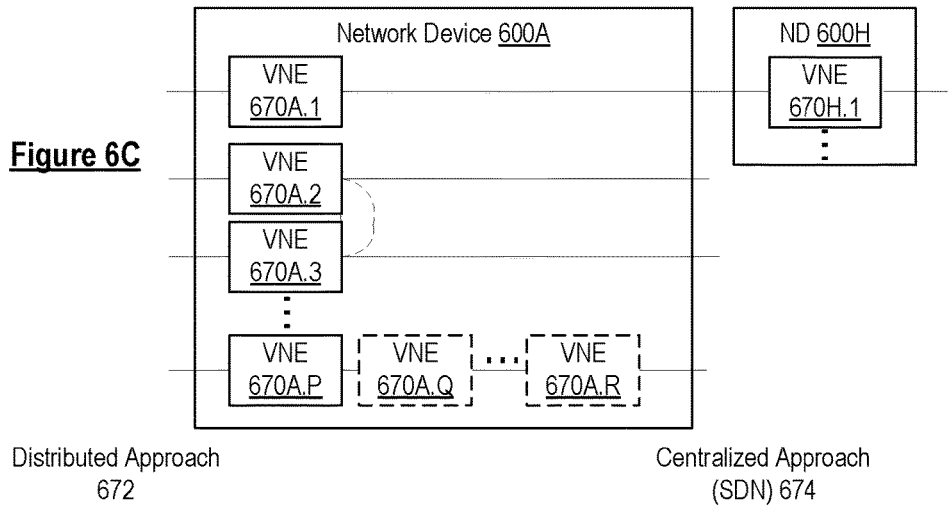
FIG. 6C illustrates various exemplary ways in which virtual network elements (VNEs) may be coupled according to some embodiments.

FIG. 6C illustrates various exemplary ways in which VNEs may be coupled according to some embodiments. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
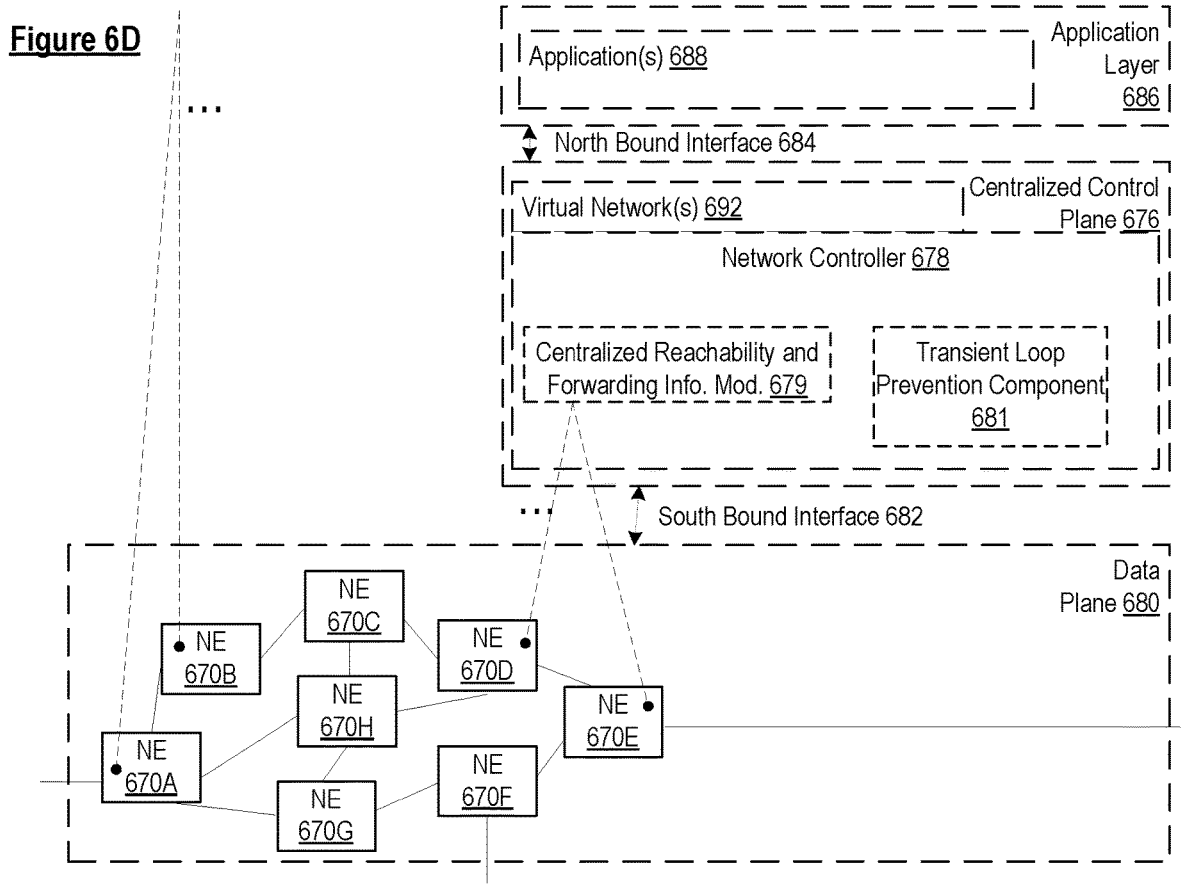
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, the network controller 678 includes a transient loop prevention component 681 that when executed by the network controller 678, causes the network controller 678 to perform operations of one or more embodiments of the present invention (e.g., to program one or more PEs in an EVPN system to implement a transient loop prevention mechanism).

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
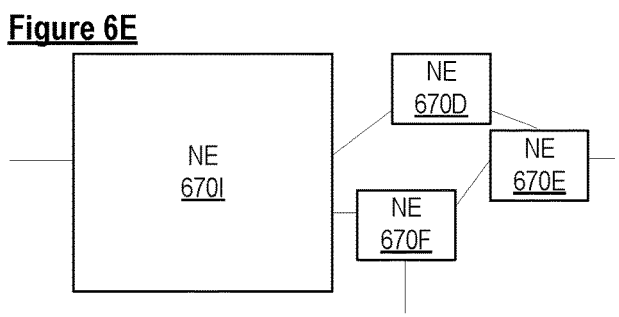
FIG. 6E illustrates the simple case of where each of the NDs implements a single NE, but a centralized control plane has abstracted multiple of the NEs in different NDs into (to represent) a single NE in one of the virtual network(s), according to some embodiments.
Figure 6F:
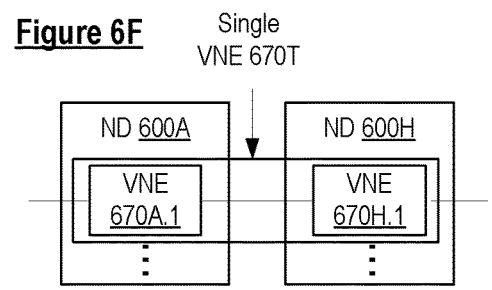
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments. Thus, the abstraction of a NE or VNE can span multiple NDs.

While some embodiments implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
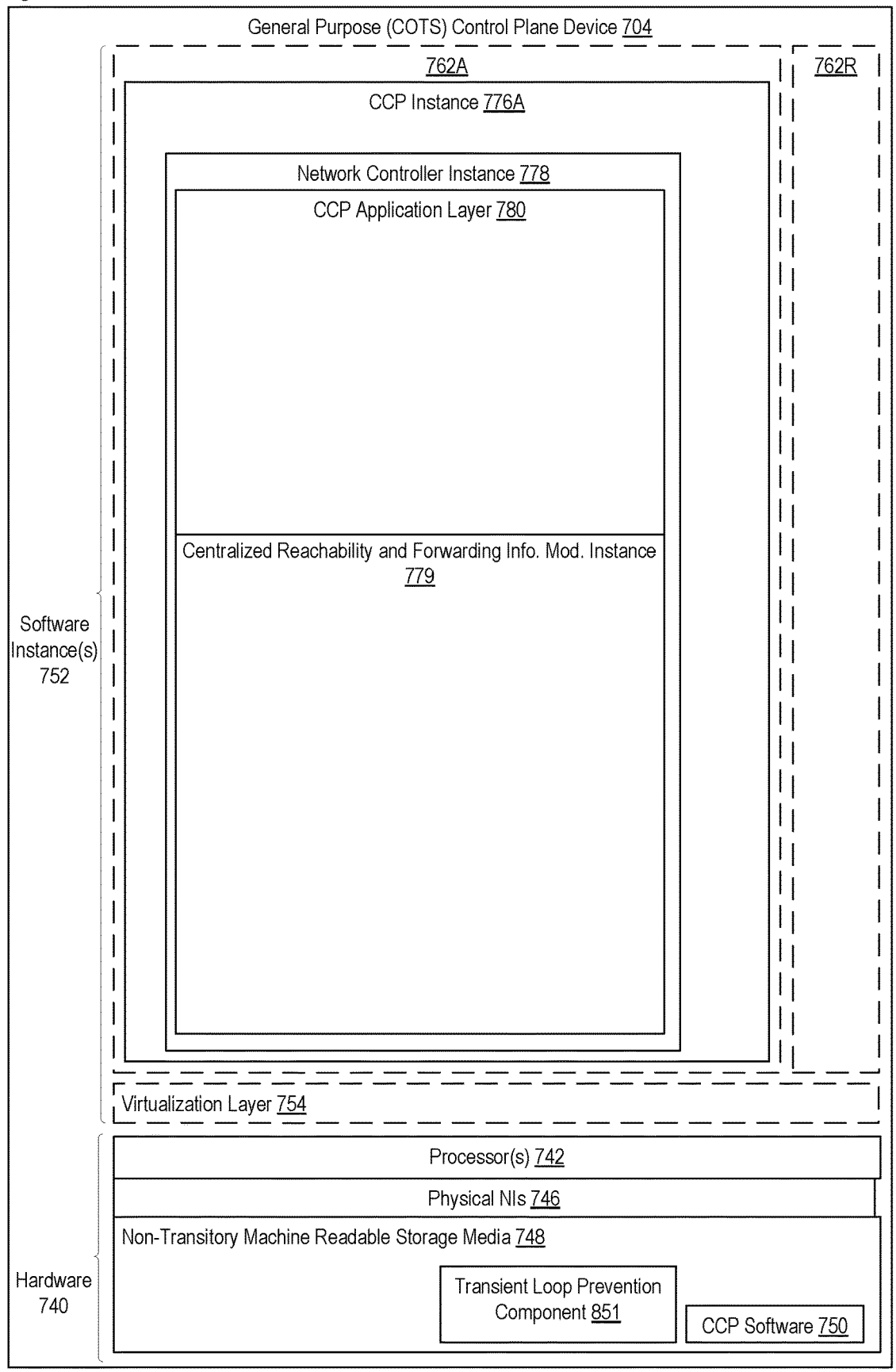
FIG. 7 illustrates a general purpose control plane device with centralized control plane (CCP) software, according to some embodiments.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750 and a transient loop prevention component 751.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The transient loop prevention component 751 can be executed by hardware 740 to perform operations of one or more embodiments of the present invention as part of software instances 752 (e.g., to prevent transient loops between multi-home peer PEs).

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by a network device functioning as a provider edge (PE) in an ethernet virtual private network (EVPN) to prevent transient loops between multi-home peer PEs, the method comprising:
   advertising, by sending a border gateway protocol (BGP) advertisement message, a first EVPN label to one or more PEs that are multi-home peer PEs of the PE, wherein PEs are multi-home peer PEs with respect to each other if they provide connectivity to the same customer edge (CE) in the same EVPN instance, wherein the BGP advertisement message indicates a route associated with the first EVPN label, a group identifier associated with the route, and an EVPN instance associated with the route;
   advertising a second EVPN label to one or more PEs that are not multi-home peer PEs of the PE;
   receiving first traffic for a CE that is encapsulated with the first EVPN label as opposed to the second EVPN label; and
   discarding the first traffic in response to determining that a link between the PE and the CE is not operational and the first traffic for the CE is encapsulated with the first EVPN label.

2. The method of claim 1, further comprising:
   receiving second traffic for the CE that is encapsulated with the second EVPN label as opposed to the first EVPN label; and
   forwarding the second traffic to a multi-home peer PE of the PE in response to determining that the link between the PE and the CE is not operational and the second traffic for the CE is encapsulated with the second EVPN label.

3. The method of claim 2, further comprising:
   receiving third traffic for the CE; and
   forwarding the third traffic for the CE to the CE in response to determining that the link between the PE and the CE is operational regardless of whether the third traffic is encapsulated with the first EVPN label or the second EVPN label.

4. The method of claim 1, wherein a combination of the group identifier and the EVPN instance uniquely identifies a multi-home peer group that the PE is a member of.

5. The method of claim 1, wherein the route is an ethernet auto-discovery route per EVPN instance route or a media access control/internet protocol (MAC/IP) advertisement route.

6. The method of claim 1, wherein the group identifier associated with the route is indicated using an ethernet segment import route target extended community field included in the BGP advertisement message and the EVPN instance associated with the route is indicated using an ethernet virtual private network instance route target (EVI-RT) extended community field included in the BGP advertisement message.

7. The method of claim 6, wherein the BGP advertisement message indicates a preference level associated with the route, wherein the preference level associated with the route is indicated using a local preference field included in the BGP advertisement message, wherein when both the first EVPN label and the second EVPN label are advertised to multi-home peer PEs of the PE the preference level associated with the route associated with the first EVPN label is higher than a preference level associated with a route associated with the second EVPN label.

8. The method of claim 1, wherein the first EVPN label is a Multiprotocol Label Switching (MPLS) label.

9. The method of claim 1, wherein the first EVPN label is a virtual extensible local area network (VxLAN) network identifier (VNI).

10. The method of claim 1, wherein the link to the CE is not operational due to a failure of the CE or the PE.

11. A non-transitory machine-readable storage medium that provides instructions that, if executed by a processor of a network device functioning as a provider edge (PE) in an ethernet virtual private network (EVPN), will cause the network device to perform operations for preventing transient loops between multi-home peer PEs, the operations comprising:
   advertising, by sending a border gateway protocol (BGP) advertisement message, a first EVPN label to one or more PEs that are multi-home peer PEs of the PE, wherein PEs are multi-home peer PEs with respect to each other if they provide connectivity to the same customer edge (CE) in the same EVPN instance, wherein the BGP advertisement message indicates a route associated with the first EVPN label, a group identifier associated with the route, and an EVPN instance associated with the route;
   advertising a second EVPN label to one or more PEs that are not multi-home peer PEs of the PE;
   receiving first traffic for a CE that is encapsulated with the first EVPN label as opposed to the second EVPN label; and
   discarding the first traffic in response to determining that a link between the PE and the CE is not operational and the first traffic for the CE is encapsulated with the first EVPN label.

12. The non-transitory machine-readable storage medium of claim 11, wherein the operations further comprise:
   receiving second traffic for the CE that is encapsulated with the second EVPN label as opposed to the first EVPN label; and
   forwarding the second traffic to a multi-home peer PE of the PE in response to determining that the link between the PE and the CE is not operational and the second traffic for the CE is encapsulated with the second EVPN label.

13. The non-transitory machine-readable storage medium of claim 11, wherein the route is an ethernet auto-discovery Route per EVPN instance route or a media access control/internet protocol (MAC/IP) advertisement route.

14. The non-transitory machine-readable storage medium of claim 13, wherein the group identifier associated with the route is indicated using an ethernet segment import route target extended community field included in the BGP advertisement message and the EVPN instance associated with the route is indicated using an ethernet virtual private network instance route target (EVI-RT) extended community field included in the BGP advertisement message.

15. The non-transitory machine-readable storage medium of claim 14, wherein the BGP advertisement message indicates a preference level associated with the route, wherein the preference level associated with the route is indicated using a local preference field included in the BGP advertisement message, wherein when both the first EVPN label and the second EVPN label are advertised to multi-home peer PEs of the PE the preference level associated with the route associated with the first EVPN label is higher than a preference level associated with a route associated with the second EVPN label.

16. A network device to function as a provider edge (PE) in an ethernet virtual private network (EVPN) to prevent transient loops between multi-home peer PEs, the network device comprising:
- a set of one or more processors; and
- a non-transitory machine-readable storage medium that provides instructions that, if executed by the set of one or more processors, will cause the network device to:
  - advertise, by sending a border gateway protocol (BGP) advertisement message, a first EVPN label to one or more PEs that are multi-home peer PEs of the PE, wherein PEs are multi-home peer PEs with respect to each other if they provide connectivity to the same customer edge (CE) in the same EVPN instance, wherein the BGP advertisement message indicates a route associated with the first EVPN label, a group identifier associated with the route, and an EVPN instance associated with the route,
  - advertise a second EVPN label to one or more PEs that are not multi-home peer PEs of the PE,
  - receive first traffic for a CE that is encapsulated with the first EVPN label as opposed to the second EVPN label, and
  - discard the first traffic in response to determining that a link between the PE and the CE is not operational and the first traffic for the CE is encapsulated with the first EVPN label.

17. The network device of claim 16, wherein the non-transitory machine-readable storage medium provides further instructions that, if executed by the set of one or more processors, will cause the network device to:
- receive second traffic for the CE that is encapsulated with the second EVPN label as opposed to the first EVPN label and
- forward the second traffic to a multi-home peer PE of the PE in response to determining that the link between the PE and the CE is not operational and the second traffic for the CE is encapsulated with the second EVPN label.

18. The network device of claim 16, wherein the route is an ethernet Auto-Discovery Route per EVPN instance route or a media access control/internet protocol (MAC/IP) advertisement route.

19. The network device of claim 18, wherein the multi-home peer group associated with the route is indicated using an ethernet segment import route target extended community field included in the BGP advertisement message and the EVPN instance associated with the route is indicated using an ethernet virtual private network instance route target (EVI-RT) extended community field included in the BGP advertisement message.

20. The network device of claim 16, wherein the first EVPN label is a Multiprotocol Label Switching (MPLS) label.

* * * * *

UNITED STATES PATENT AND TRADEMARK OFFICE
CERTIFICATE OF CORRECTION

PATENT NO. : 12,355,660 B2
APPLICATION NO. : 18/001233
DATED : July 8, 2025
INVENTOR(S) : He et al.

It is certified that error appears in the above-identified patent and that said Letters Patent is hereby corrected as shown below:

In the Drawings

In Fig. 6A, Sheet 6 of 8, delete "Virtulization" and insert -- Virtualization --, therefor.

In the Specification

In Column 4, Lines 2-3, delete "straight forward" and insert -- straightforward --, therefor.

In Column 6, Line 15, delete "part" and insert -- part of --, therefor.

In Column 7, Line 36, delete "VxLAN/NVGRE/GENEVE" and insert
-- VXLAN/NVGRE/GENEVE --, therefor.

In Column 7, Line 38, delete "VxLAN" and insert -- VXLAN --, therefor.

In Column 10, Line 55, delete "operation" and insert -- operation '11b', --, therefor.

In Column 14, Line 58, delete "Gateway))." and insert -- Gateway))). --, therefor.

In Column 16, Line 34, delete "that that" and insert -- that --, therefor.

In Column 16, Line 47, delete "out" and insert -- out to --, therefor.

In Column 16, Line 57, delete "values." and insert -- values). --, therefor.

In Column 18, Line 27, delete "network))." and insert -- network). --, therefor.

In Column 18, Line 36, delete "straight forward" and insert -- straightforward --, therefor.

Signed and Sealed this
Thirtieth Day of December, 2025

John A. Squires
*Director of the United States Patent and Trademark Office*

In Column 18, Line 60, delete "RSVP-TE))" and insert -- RSVP-TE))) --, therefor.

In the Claims

In Column 26, Line 9, in Claim 7, delete "a preference level associated with a route" and insert -- the preference level associated with the route --, therefor.

In Column 26, Line 14, in Claim 9, delete "(VxLAN)" and insert -- (VXLAN) --, therefor.

In Column 26, Line 56, in Claim 13, delete "Route" and insert -- route --, therefor.

In Column 27, Lines 7-8, in Claim 15, delete "a preference level associated with a route" and insert -- the preference level associated with the route --, therefor.

In Column 28, Line 11, in Claim 17, delete "label and" and insert -- label; and --, therefor.

In Column 28, Lines 20-21, in Claim 19, delete "the multi-home peer group" and insert -- a multi-home peer group --, therefor.